US012761016B2

(12) United States Patent
Fuyuno et al.

(10) Patent No.: US 12,761,016 B2
(45) Date of Patent: Oct. 13, 2026

(54) OPTICAL DISPLACEMENT METER

(71) Applicant: Keyence Corporation, Osaka (JP)

(72) Inventors: Akira Fuyuno, Osaka (JP); Tatsuro Homma, Osaka (JP); Kaoru Kanayama, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 142 days.

(21) Appl. No.: 18/780,601

(22) Filed: Jul. 23, 2024

(65) Prior Publication Data

US 2025/0076032 A1 Mar. 6, 2025

(30) Foreign Application Priority Data

Aug. 30, 2023 (JP) ................................ 2023-139461

(51) Int. Cl.
*G01B 11/25* (2006.01)

(52) U.S. Cl.
CPC ................................ *G01B 11/2518* (2013.01)

(58) Field of Classification Search
CPC ... G01B 11/2518; G01B 11/24; G01B 11/022; G01S 7/4808; G01S 17/48
See application file for complete search history.

(56) References Cited

U.S. PATENT DOCUMENTS 5,589,941 A * 12/1996 Sabater .................. G01B 11/24 250/559.27
10,746,529 B1 8/2020 Miyagawa
10,746,536 B2 8/2020 Tsuchida
10,767,976 B2 9/2020 Tsuchida
10,921,114 B2 2/2021 Fuyuno et al.
11,073,376 B2 7/2021 Fuyuno
11,112,236 B2 * 9/2021 Homma ................. G01B 11/04
(Continued)

FOREIGN PATENT DOCUMENTS

CN 210664364 U * 6/2020
EP 3232152 A1 10/2017

OTHER PUBLICATIONS

U.S. Appl. No. 18/780,568, filed Jul. 23, 2024 (61 pages).
(Continued)

*Primary Examiner* — Michelle M Iacoletti
*Assistant Examiner* — Mohamed Doumbia
(74) *Attorney, Agent, or Firm* — Kilyk & Bowersox, P.L.L.C.

(57) ABSTRACT

An optical displacement meter that measures a cross-sectional profile of a workpiece, and includes: a light projecting/receiving module including a light projecting unit that emits slit light extending in an X direction, a light receiving lens that collects reflected light of the slit light reflected by the workpiece, and an imaging unit that receives light collected by the light receiving lens; a motor that integrally rotates the light projecting/receiving module; and a control unit that controls the motor to scan the slit light in a direction orthogonal to the X direction. A rotation angle is limited to prevent specularly reflected light reflected from a specular reflection surface from being captured by the imaging unit when the light projecting unit irradiates the workpiece having the specular reflection surface parallel to an X-Y plane extending in the X direction and a Y direction with the slit light.

14 Claims, 12 Drawing Sheets

(56) References Cited

U.S. PATENT DOCUMENTS

| | | | | |
|---|---|---|---|---|
| 11,293,749 | B2 | 4/2022 | Tsuchida | |
| 11,747,136 | B2 | 9/2023 | Fujimoto | |
| 12,000,688 | B2 | 6/2024 | Kanayama et al. | |
| 2020/0096316 | A1* | 3/2020 | Vinshtok ............ | G01B 11/2545 |
| 2024/0271925 | A1 | 8/2024 | Kanayama et al. | |

OTHER PUBLICATIONS

U.S. Appl. No. 18/780,584, filed Jul. 23, 2024 (64 pages).
U.S. Appl. No. 18/780,619, filed Jul. 23, 2024 (47 pages).
U.S. Appl. No. 18/780,680, filed Jul. 23, 2024 (91 pages).
U.S. Appl. No. 18/780,710, filed Jul. 23, 2024 (92 pages).
U.S. Appl. No. 19/095,066, filed Mar. 31, 2025 (58 pages).
U.S. Appl. No. 19/095,069, filed Mar. 31, 2025 (64 pages).

* cited by examiner

OPTICAL DISPLACEMENT METER

CROSS-REFERENCE TO RELATED APPLICATIONS

The present application claims foreign priority based on Japanese Patent Application No. 2023-139461, filed Aug. 30, 2023, the contents of which are incorporated herein by reference.

BACKGROUND OF THE INVENTION

1. Technical Field

The invention relates to an optical displacement meter.

2. Description of the Related Art

A conventional optical displacement meter relatively moves in parallel to an XY plane with respect to a measurement object (workpiece) to acquire XZ cross-sectional profiles of the workpiece at different positions in a Y direction and generates three-dimensional shape data from these profiles. Therefore, in the conventional optical displacement meter, a relative angle of a light projecting/receiving system with respect to a workpiece surface does not change greatly, and the probability that specularly reflected light from the workpiece surface is incident on a light receiving system is low unless the workpiece is in an installation state for measurement using specular reflection.

The conventional optical displacement meter requires equipment such as a conveyor for conveying the workpiece and a linear motion mechanism for moving a main body of the conventional optical displacement meter with respect to the workpiece.

However, installation space, cost, and the like may hinder introduction of the above-described equipment.

Meanwhile, as an optical displacement meter capable of acquiring XZ cross-sectional profiles of a workpiece at different positions in a Y direction and generating three-dimensional shape data from these profiles without requiring the above-described equipment, an optical displacement meter that rotates a light projecting system and a light receiving system is known (see European Patent Application Publication No. 3232152 and Chinese Utility Model No. 210664364).

In the optical displacement meter that rotates the light projecting system and the light receiving system, measurement is performed by rotating the light projecting system and the light receiving system with respect to a stationary workpiece, and thus, the probability that specularly reflected light from a workpiece surface is incident on the light receiving system increases.

However, in European Patent Application Publication No. 3232152 and Chinese Utility Model No. 210664364, no countermeasure is taken against the specularly reflected light from the workpiece surface, the specularly reflected light being generated by rotating the light projecting system and the light receiving system.

SUMMARY OF THE INVENTION

In view of the above problems, an object of the invention is to provide an optical displacement meter capable of suppressing an influence of specularly reflected light from a workpiece surface, the specularly reflected light being generated by rotating a light projecting system and a light receiving system.

An optical displacement meter according to the invention is an optical displacement meter of a light sectioning method that measures a cross-sectional profile of a workpiece having a height in a Z direction based on a principle of triangulation, and includes: a light projecting/receiving module including a light projecting unit that emits slit light extending in an X direction, a light receiving lens that collects reflected light of the slit light reflected by the workpiece, and an imaging unit that receives light collected by the light receiving lens; a motor that integrally rotates the light projecting/receiving module; and a control unit that controls the motor to scan the slit light in a direction orthogonal to the X direction, and a rotation angle of the light projecting/receiving module is limited to prevent specularly reflected light reflected from a specular reflection surface from being captured by the imaging unit when the light projecting unit irradiates the workpiece having the specular reflection surface, parallel to an X-Y plane extending in the X direction and a Y direction, with the slit light.

Note that other features, elements, steps, advantages, and characteristics will be more apparent from the following detailed description of preferred embodiments and the accompanying drawings.

According to the invention, it is possible to provide the optical displacement meter capable of suppressing an influence of specularly reflected light from a workpiece surface, the specularly reflected light being generated by rotating a light projecting system component and a light receiving system component.

DETAILED DESCRIPTION

<Optical Displacement Measurement System>

Figure 1:
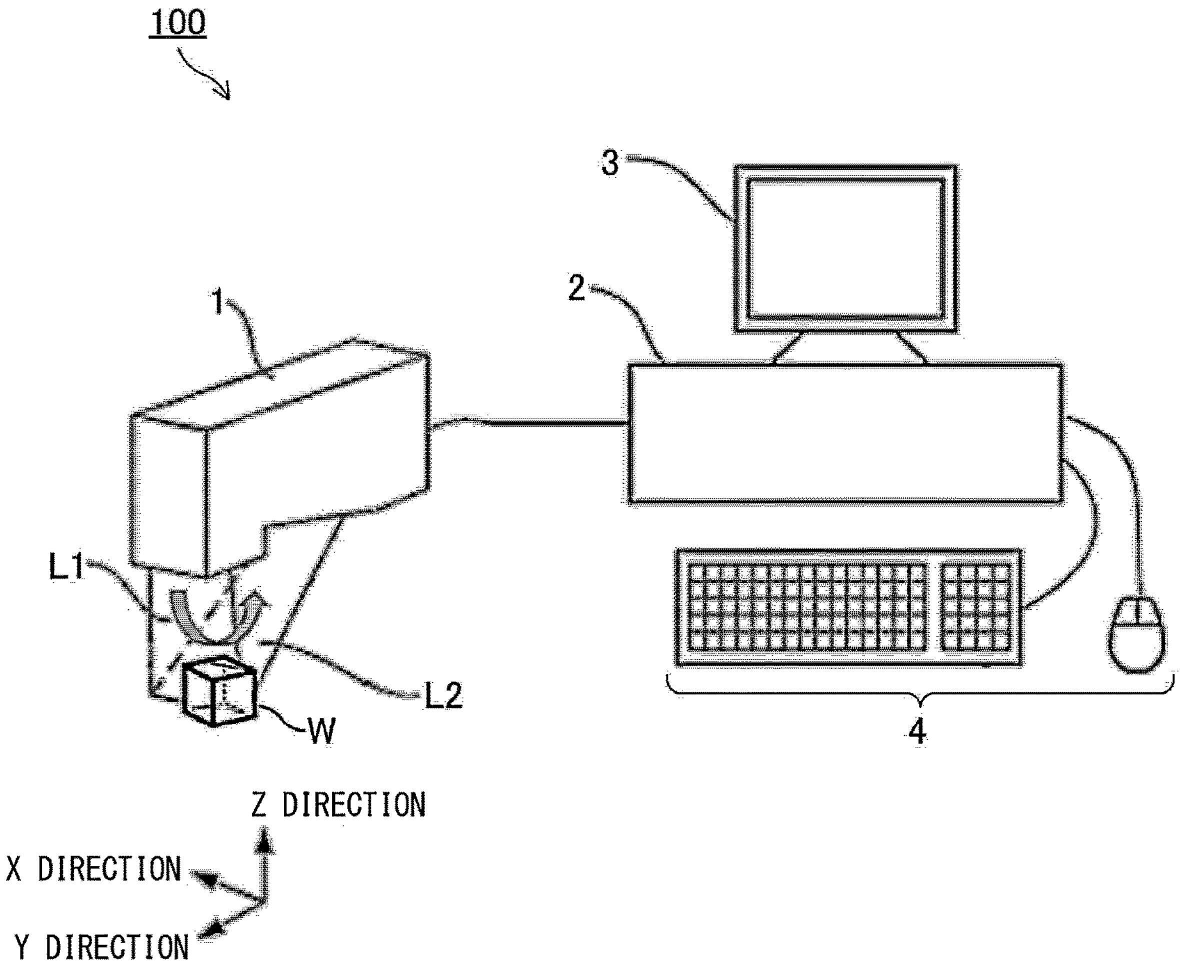
FIG. 1 is a diagram illustrating an optical displacement measurement system.

FIG. 1 is a diagram illustrating a schematic configuration example of an optical displacement measurement system. An optical displacement measurement system 100 of the present configuration example includes an optical displacement meter 1, a control device 2, a display device 3, and an input device 4.

In the present configuration example, an X direction corresponds to a width direction of slit light L1 output from the optical displacement meter 1, a Z direction corresponds to a height direction of a workpiece W, and a Y direction corresponds to a direction in which the slit light L1 moves by rotation of a light projecting unit (not illustrated in FIG. 1). A XZ plane to be described later is a plane extending in the X direction and the Z direction. Note that the optical displacement meter 1 scans the slit light L1 by rotating a light projecting/receiving module 20, and thus, a scanning direction of the slit light L1 is a direction orthogonal to the X direction on a YZ plane including the Y direction. Note that "rotation" in the present specification means swinging motion that reciprocates with a rotation axis as the center.

The optical displacement measurement system 100 is a system that measures a profile and a three-dimensional shape of the workpiece W. The profile of the workpiece W is data indicating an outer edge of a cut surface of the workpiece W by the slit light L1. When the slit light is emitted in parallel to the XZ plane, the profile of the workpiece W is data indicating an outer edge of a cut surface parallel to the XZ plane, and thus, is also referred to as a two-dimensional profile of a XZ cross-section of the workpiece W.

For example, the profile is an aggregate of (xi, zi) (i is an index). "xi" indicates a position in the X direction. "zi" indicates a height in the Z direction. Note that the three-dimensional shape is an aggregate of (xi, yi, zi). "yi" indicates a position in the Y direction.

The optical displacement meter 1 operates in accordance with an instruction from the control device 2. The optical displacement meter 1 outputs the slit light L1 extending in the X direction and receives reflected light L2 from the workpiece W. Then, the optical displacement meter 1 calculates a profile of the workpiece W based on a light receiving result. The optical displacement meter 1 captures images at regular intervals to generate profiles of the workpiece W having different values of yi. In addition, the optical displacement meter 1 generates three-dimensional shape data of the workpiece W from the profiles of the workpiece W having different values of yi.

The control device 2 outputs an instruction based on a user input received by the input device 4 to the optical displacement meter 1, and receives a measurement result of the workpiece W from the optical displacement meter 1. In addition, the control device 2 outputs a display signal to the display device 3. The control device 2 is, for example, a personal computer, a programmable logic control unit, or the like.

The display device 3 displays, for example, the measurement result of the workpiece W, a user interface (UI) for setting the optical displacement meter 1, and the like based on the display signal from the control device 2.

The input device 4 receives the user input with respect to the optical displacement measurement system 100. In FIG. 1, a keyboard and a mouse are illustrated as the input device 4. However, the input device 4 is not limited to the keyboard and the mouse. For example, the input device 4 may be a touch panel disposed on a display screen of the display device 3.

Figure 2:
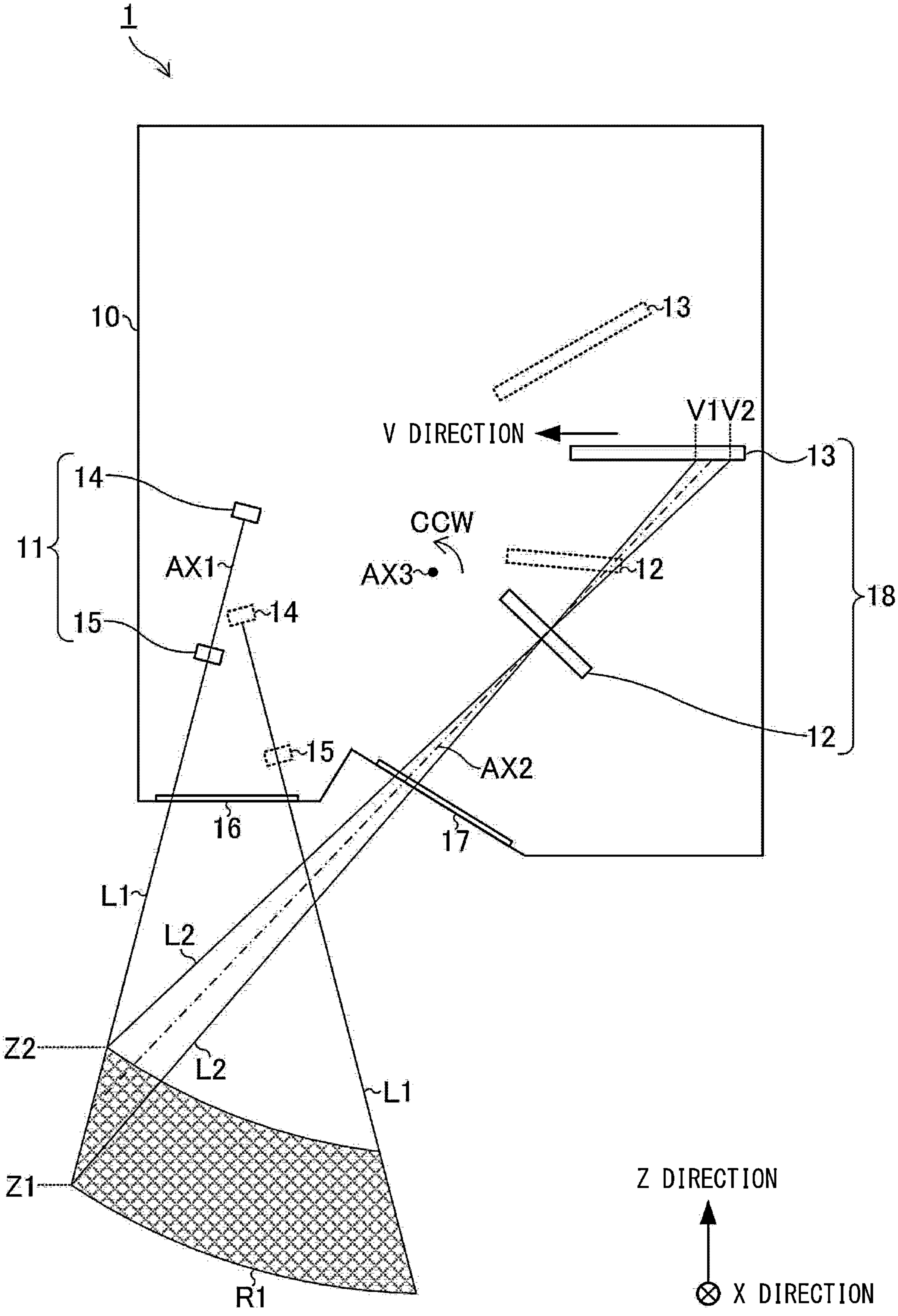
FIG. 2 is a view illustrating the principle of triangulation.

FIG. 2 is a view for describing the principle of a light sectioning method (triangulation). A light projecting unit 11, a light receiving lens 12, and an imaging unit 13 are stored in a housing 10 of the optical displacement meter 1. The light projecting unit 11 includes a light source 14 and a light projecting lens 15. For example, the light source 14 may be a laser light emitter, and the light projecting lens 15 may include a plurality of lenses including a cylindrical lens.

Light output from the light source 14 passes through the light projecting lens 15 and is converted into the slit light L1. The housing 10 is provided with a light projecting window 16 having a light transmitting property that allows the slit light L1 to pass therethrough. Similarly, the housing 10 is provided with a light receiving window 17 having a light transmitting property that allows the reflected light L2 to pass therethrough. The light projecting window 16 and the light receiving window 17 are separate bodies (separate components). Since the light projecting window 16 and the light receiving window 17 are separate bodies, each of the light projecting window 16 and the light receiving window 17 is a flat plate-shaped component, and the light projecting window 16 and the light receiving window 17 can be easily manufactured. However, the light projecting window 16 and the light receiving window 17 may be integrated (one component).

The light receiving lens 12 is a lens configured to collect the reflected light L2 and form an image on a light receiving surface of the imaging unit 13. The light receiving lens 12 may include only one lens or may include a plurality of lenses. In addition, the light receiving lens 12 may also include an optical component (for example, an optical filter or the like) other than the lens. The imaging unit 13 is an image sensor including a plurality of photoelectric conversion elements arranged two-dimensionally. The imaging unit 13 receives the light collected by the light receiving lens.

As illustrated in FIG. 2, an optical axis AX2 of the light receiving lens 12 is inclined with respect to a light projection axis AX1 of the light projecting unit 11. The light projection axis AX1 of the light projecting unit 11 coincides with an optical axis of the light source 14. As a result, the reflected light L2 from a height Z1 forms an image at a position V1 in a V direction of the light receiving surface of the imaging unit 13, and the reflected light L2 from a height Z2 forms an image at a position V2 in the V direction of the light receiving surface of the imaging unit 13. That is, the V direction of the light receiving surface of the imaging unit 13 corresponds to the Z direction of the workpiece W. Although a U direction of the light receiving surface of the imaging unit 13 is not illustrated, the U direction corresponds to the X direction of the workpiece W. That is, a vertical direction of an image, which is a light receiving result output by the imaging unit 13, is the V direction, and a horizontal direction thereof is the U direction.

The light projecting unit 11, the light receiving lens 12, and the imaging unit 13 are rotatable about a rotation axis AX3 along the X direction in a state of satisfying the Scheimpflug relationship in which the light receiving surface of the imaging unit 13 is inclined with respect to the optical axis of the light receiving lens 12. Relative positions of the light projecting unit 11, the light receiving lens 12, and the imaging unit 13 are fixed. In FIG. 2, a state of the light projecting unit 11, the light receiving lens 12, and the imaging unit 13 before rotation in a counterclockwise direction CCW is illustrated by a solid line, and a state thereof after rotation in the counterclockwise direction CCW is illustrated by a broken line.

The light projecting unit 11, the light receiving lens 12, and the imaging unit 13 are rotatable about the rotation axis AX3 along the X direction in the state of satisfying the Scheimpflug relationship. As a result, each cross-section through which the light projection axis AX1 passes is in focus in a region R1 illustrated by hatching in FIG. 2. That is, the optical displacement meter 1 can generate the profile of the workpiece W in focus even if the height of the workpiece W changes.

Note that the positional relationship among the light projecting unit 11, the light receiving lens 12, and the imaging unit 13 may be opposite to the positional relationship illustrated in FIG. 2.

Figure 3:
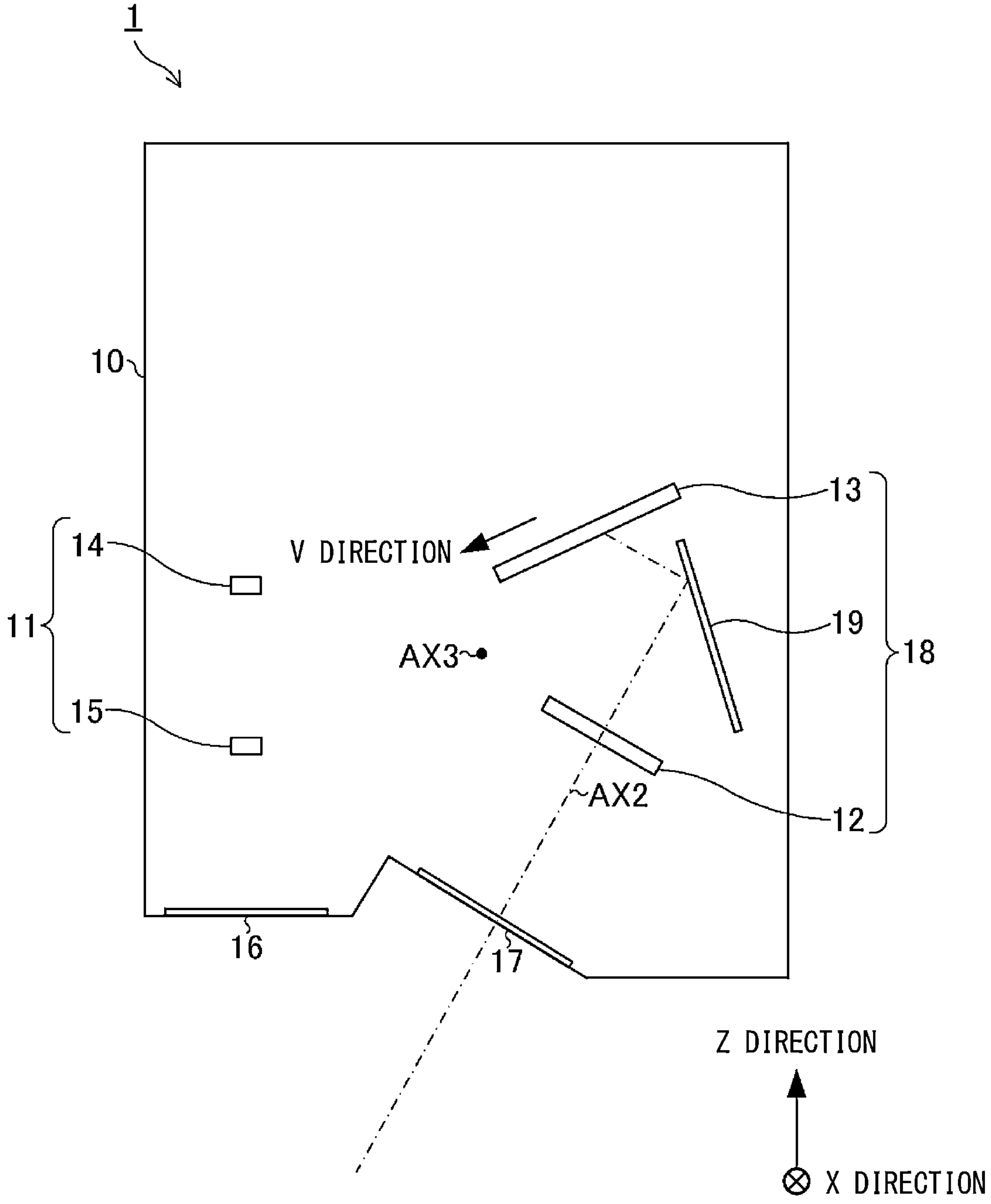
FIG. 3 is a view illustrating an optical displacement meter including a reflecting member.

In addition, the optical displacement meter 1 may further include a reflecting member 19 as illustrated in FIG. 3. In a case where the optical displacement meter 1 includes the reflecting member 19, a light receiving unit 18 includes the light receiving lens 12, the imaging unit 13, and the reflecting member 19. The reflecting member 19 is provided on an optical path between the light receiving window 17 and the imaging unit 13, and turns the reflected light L2 and the optical axis AX2 of the light receiving lens 12 toward the light projecting unit 11. As a result, it is possible to form a compact light projecting/receiving module that integrally holds the light projecting unit 11, the light receiving lens 12, the imaging unit 13, and the reflecting member 19 in the YZ plane extending in the Y direction and the Z direction. Therefore, it is possible to reduce a moment of inertia about the rotation axis AX3 of the light projecting/receiving module integrally holding the light projecting unit 11, the light receiving lens 12, the imaging unit 13, and the reflecting member 19.

In FIG. 3, the reflecting member 19 is provided on the optical path between the light receiving lens 12 and the imaging unit 13, but may be provided on an optical path between the light receiving window 17 and the light receiving lens 12 (for example, see FIGS. 8 and 9 to be described later).

In a case where the reflecting member 19 is provided on the optical path between the light receiving lens 12 and the imaging unit 13, the reflecting member 19 reflects the light collected by the light receiving lens 12, and thus, the area of a reflection surface of the reflecting member 19 can be reduced. In a case where the reflecting member 19 is provided on the optical path between the light receiving window 17 and the light receiving lens 12, the heavy light receiving lens 12 can be disposed close to the rotation axis AX3, and thus, the effect of reducing the moment of inertia increases.

<Position (Calculation of Height)>

Figure 4:
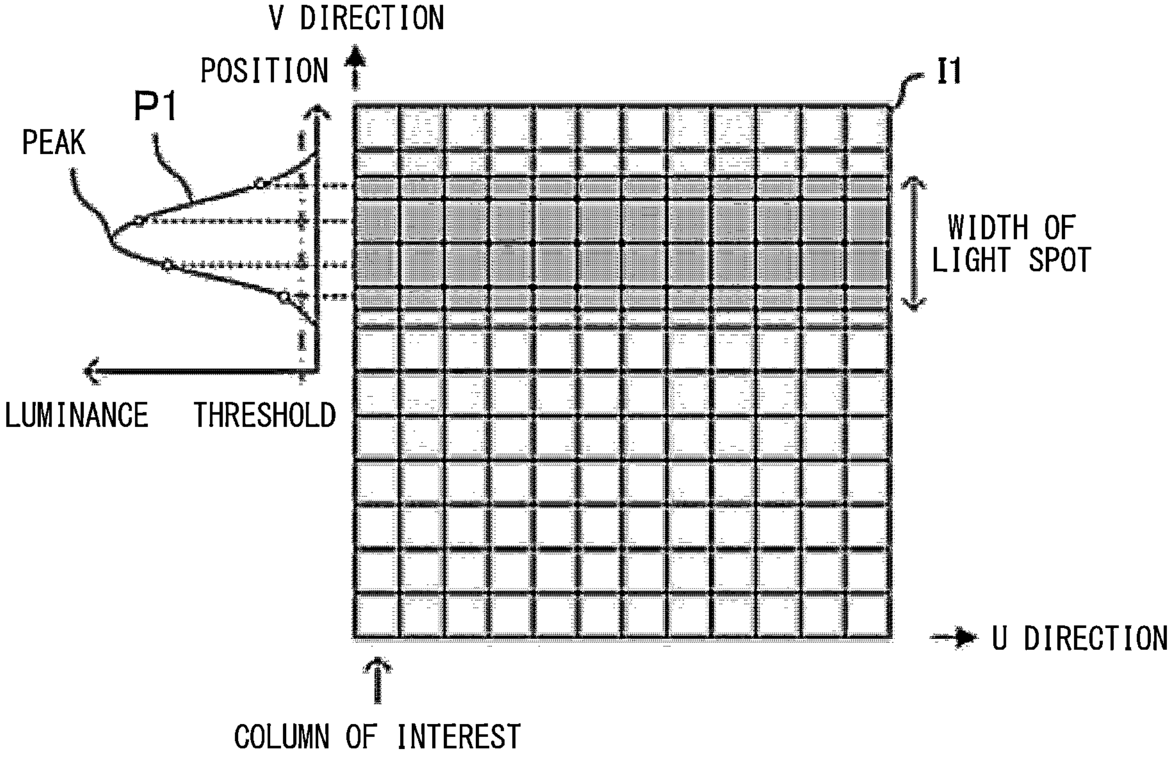
FIG. 4 is a view illustrating a method of detecting a peak position.

FIG. 4 is a view for describing a method of calculating a height forming a profile from an image I1 that is a light receiving result output by the imaging unit 13. The slit light L1 has a certain width in the Y direction. Therefore, a width of a light spot formed by the reflected light L2 on the light receiving surface of the imaging unit 13 is also a width that spans the plurality of photoelectric conversion elements.

Therefore, the optical displacement meter 1 obtains an approximate curve P1 indicating a change in a luminance value from luminance values of pixels, and calculates a position in the V direction at which a peak value is obtained in the approximate curve P1. In FIG. 4, the leftmost column is a column of interest, and the distribution (approximate curve P1) of luminance values of the column of interest is illustrated. The approximate curve P1 is obtained by curve fitting or the like of a plurality of sample values. A sample value below a detection threshold is not considered. The position in the V direction at which the peak value is obtained indicates a height of the workpiece W. The optical displacement meter 1 obtains the approximate curve P1 at each position (each pixel column) in the U direction, and calculates the position (height) in the V direction at which the peak value is obtained from the approximate curve P1. This calculation processing is executed at each position in the U direction, thereby obtaining one profile. Such calculation processing may be referred to as subpixel processing.

Note that, for example, a coordinate conversion condition (for example, a coordinate conversion table) indicating a correspondence relationship among UV coordinates, a rotation angle θ, and local coordinates (X, Y, Z) and expressed by (U, V, θ)=(X, Y, Z) is generated by calibration before shipment, and is stored in a storage unit (not illustrated) of the optical displacement meter 1, and thus, the optical displacement meter 1 can convert a profile in a UV coordinate system into a profile in an XYZ coordinate system based on the rotation angle θ by simple calculation.

<Functional Blocks>

Figure 5:
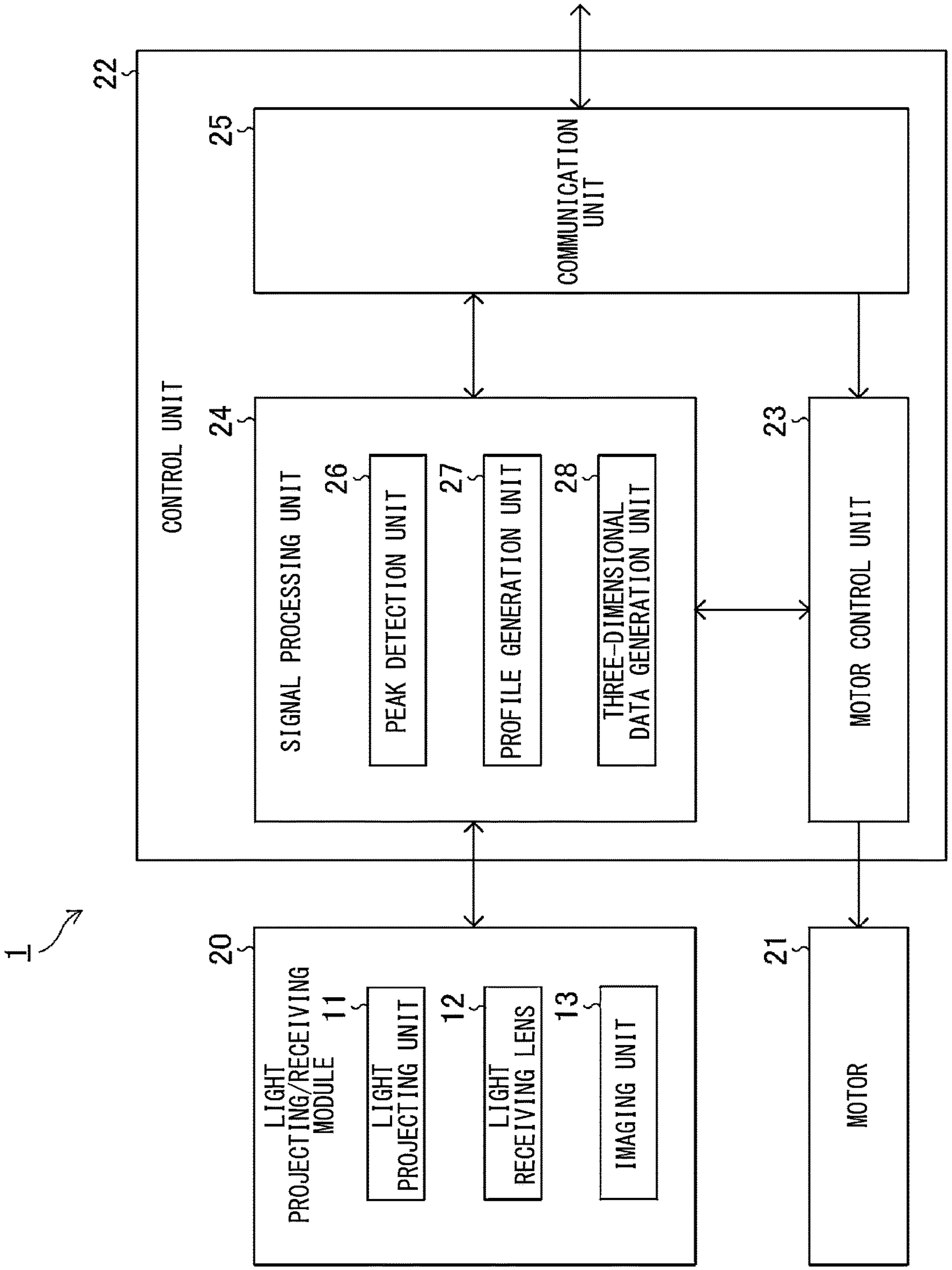
FIG. 5 is a functional block diagram of the optical displacement meter.

FIG. 5 is a functional block diagram of the optical displacement meter 1. The optical displacement meter 1 includes the light projecting/receiving module 20, a motor 21, and a control unit 22.

The light projecting/receiving module 20 holds the light projecting unit 11, the light receiving lens 12, and the imaging unit 13 in an integrated manner. In addition, in a case where the optical displacement meter 1 includes the reflecting member 19, the light projecting/receiving module 20 holds the light projecting unit 11, the light receiving lens 12, the imaging unit 13, and the reflecting member 19 (not illustrated in FIG. 5) in an integrated manner.

The motor 21 rotates the light projecting unit 11, the light receiving lens 12, and the imaging unit 13. More specifically, the motor 21 rotates the light projecting/receiving module 20. The motor 21 may rotate the light projecting/receiving module 20 by a direct drive system in which an intermediate mechanism such as a speed reducer is not disposed between the motor 21 and the light projecting/receiving module 20, or may rotate the light projecting/receiving module 20 via the intermediate mechanism such as the speed reducer.

The control unit 22 includes a motor control unit 23, a signal processing unit 24, and a communication unit 25. The control unit 22 controls the motor 21 to rotate the light projecting unit 11, the light receiving lens 12, and the imaging unit 13 in the state of satisfying the Scheimpflug relationship, and scans the slit light L1 in a direction orthogonal to the X direction. More specifically, the motor control unit 23 controls the motor 21 to rotate the light projecting unit 11, the light receiving lens 12, and the imaging unit 13 in the state of satisfying the Scheimpflug relationship, and the signal processing unit 24 controls the light projecting unit 11 to emit the slit light L1 from the light projecting unit 11.

The signal processing unit 24 includes a peak detection unit 26, a profile generation unit 27, and a three-dimensional data generation unit 28. The peak detection unit 26 detects positions (peak positions) in the V direction having peaks of luminance values based on light receiving results output from the imaging unit 13. The profile generation unit 27 generates one piece of profile data by collecting heights (zi) of the workpieces W at the respective positions (xi) in the X direction obtained by the peak detection unit 26. The three-dimensional data generation unit 28 generates three-dimensional shape data of the workpiece W from profiles of the workpieces W having different values of yi and generated by the profile generation unit 27. Note that at least a part of the peak detection unit 26, the profile generation unit 27, and the three-dimensional data generation unit 28 may be provided inside not the optical displacement meter 1 but the control device 2 (see FIG. 1).

The communication unit 25 performs wired or wireless communication with the control device 2. For example, the communication unit 25 receives an instruction from the control device 2 and transmits the instruction to the control unit 22. In addition, the communication unit 25 transmits, for example, the profile data and the three-dimensional shape data of the workpiece W generated by the signal processing unit 24 to the control device 2.

<Layout of Motor>

Figure 6:
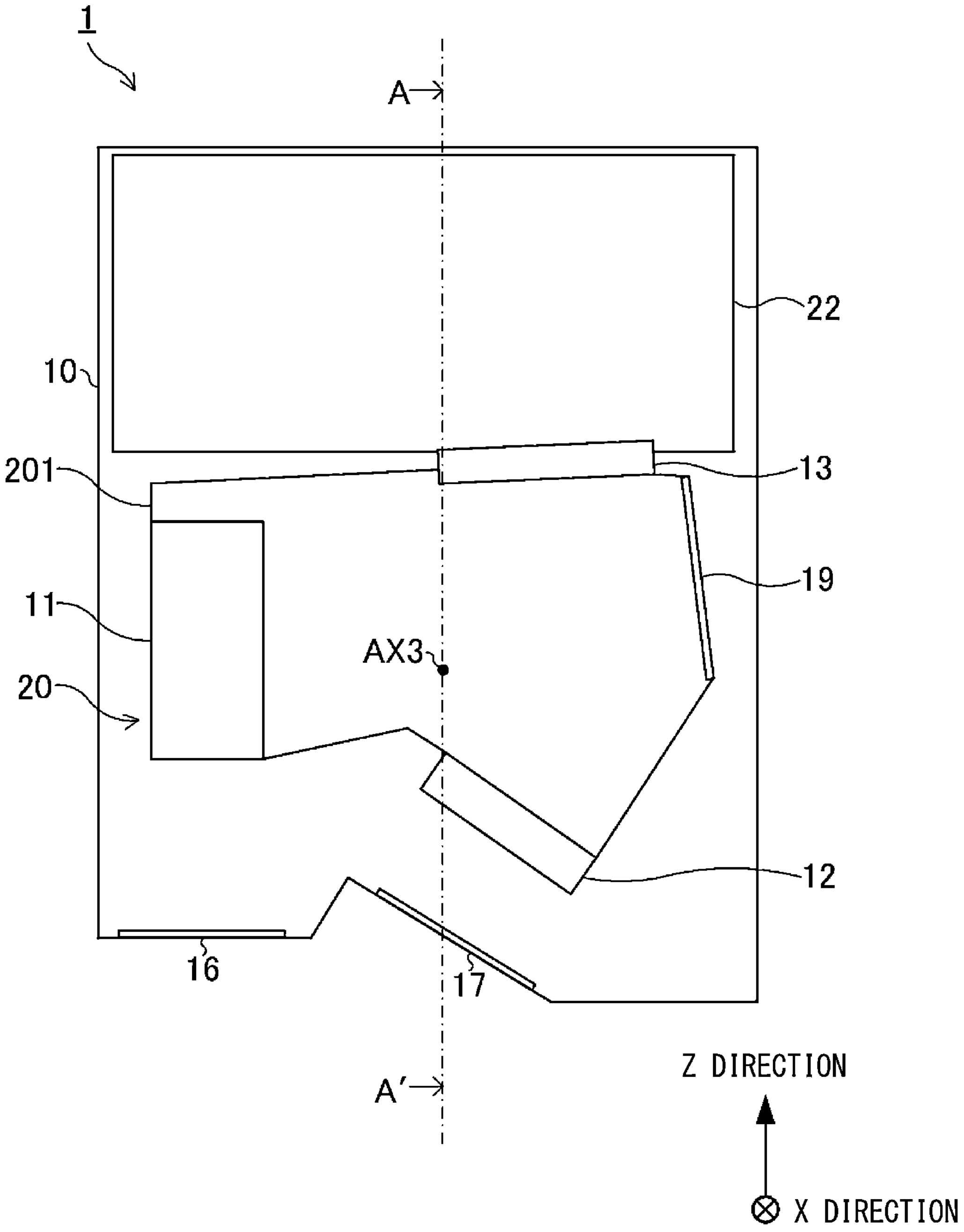
FIG. 6 is a view illustrating a first example of a layout of a motor.
Figure 7:
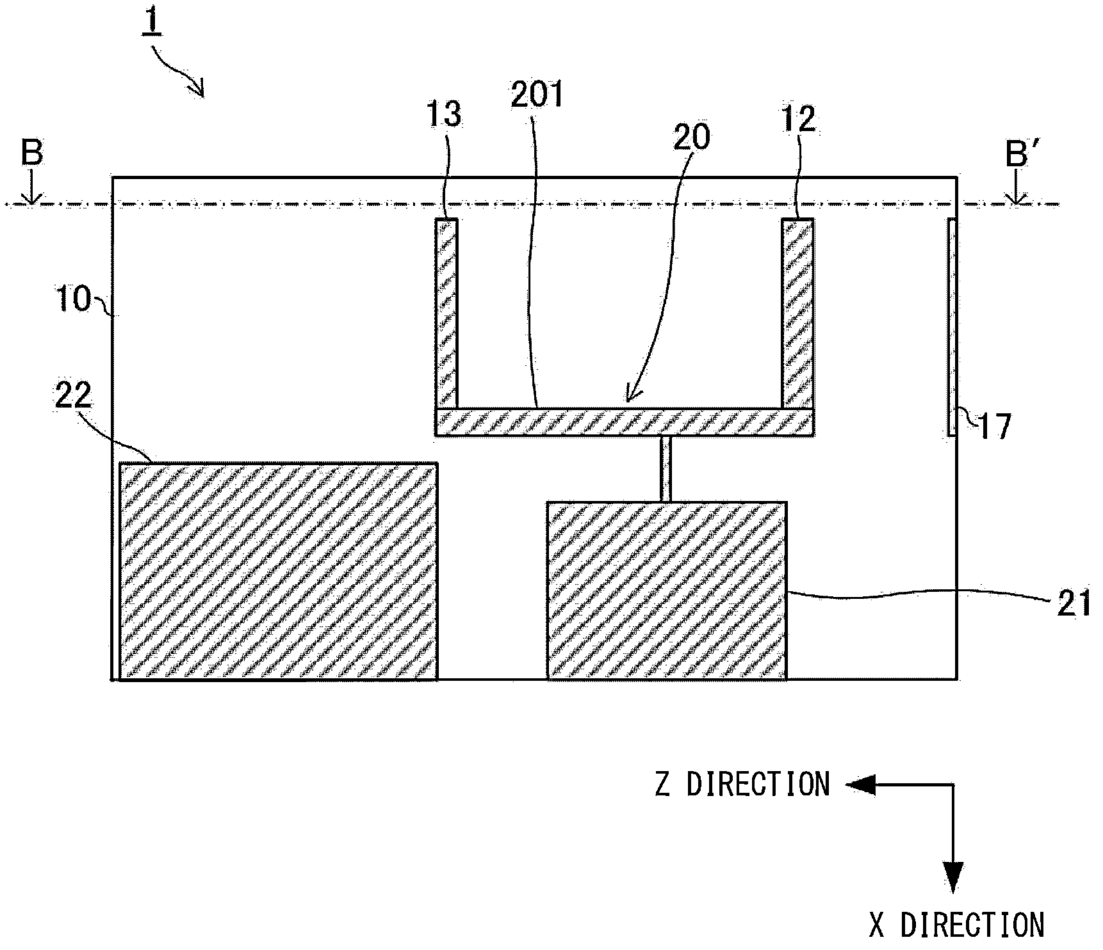
FIG. 7 is a view illustrating the first example of the layout of the motor.

FIGS. 6 and 7 are views illustrating a first example of a layout of the motor 21. FIG. 6 is a cross-sectional view perpendicular to the X direction of the optical displacement meter 1 taken along line B-B' in FIG. 7. FIG. 7 is a cross-sectional view along the XZ plane of the optical displacement meter 1 taken along line A-A' in FIG. 6.

In the first example, the light projecting/receiving module 20 includes a plate-shaped base member 201 extending along a plane perpendicular to the X direction. The light projecting unit 11, the light receiving lens 12, the imaging unit 13, and the reflecting member 19 are mounted on the base member 201.

In the first example, the light projecting/receiving module 20 does not overlap the motor 21 and an accessory component of the motor 21 in the X direction. The accessory component of the motor 21 is, for example, an encoder that detects a rotation amount of a rotor of the motor 21. According to the first example of the layout of the motor 21, it is easy to dispose the light projecting unit 11 close to the light receiving lens 12, and the imaging unit 13. The light projecting/receiving module 20 can be made compact by bringing the light projecting unit 11 close to the light receiving lens 12 and the imaging unit 13. Therefore, the moment of inertia about the rotation axis AX3 of the light projecting/receiving module 20 can be reduced.

In addition, in the first example, the control unit 22 does not overlap the light projecting/receiving module 20 in the X direction but overlaps the motor 21 in the X direction.

Figure 8:
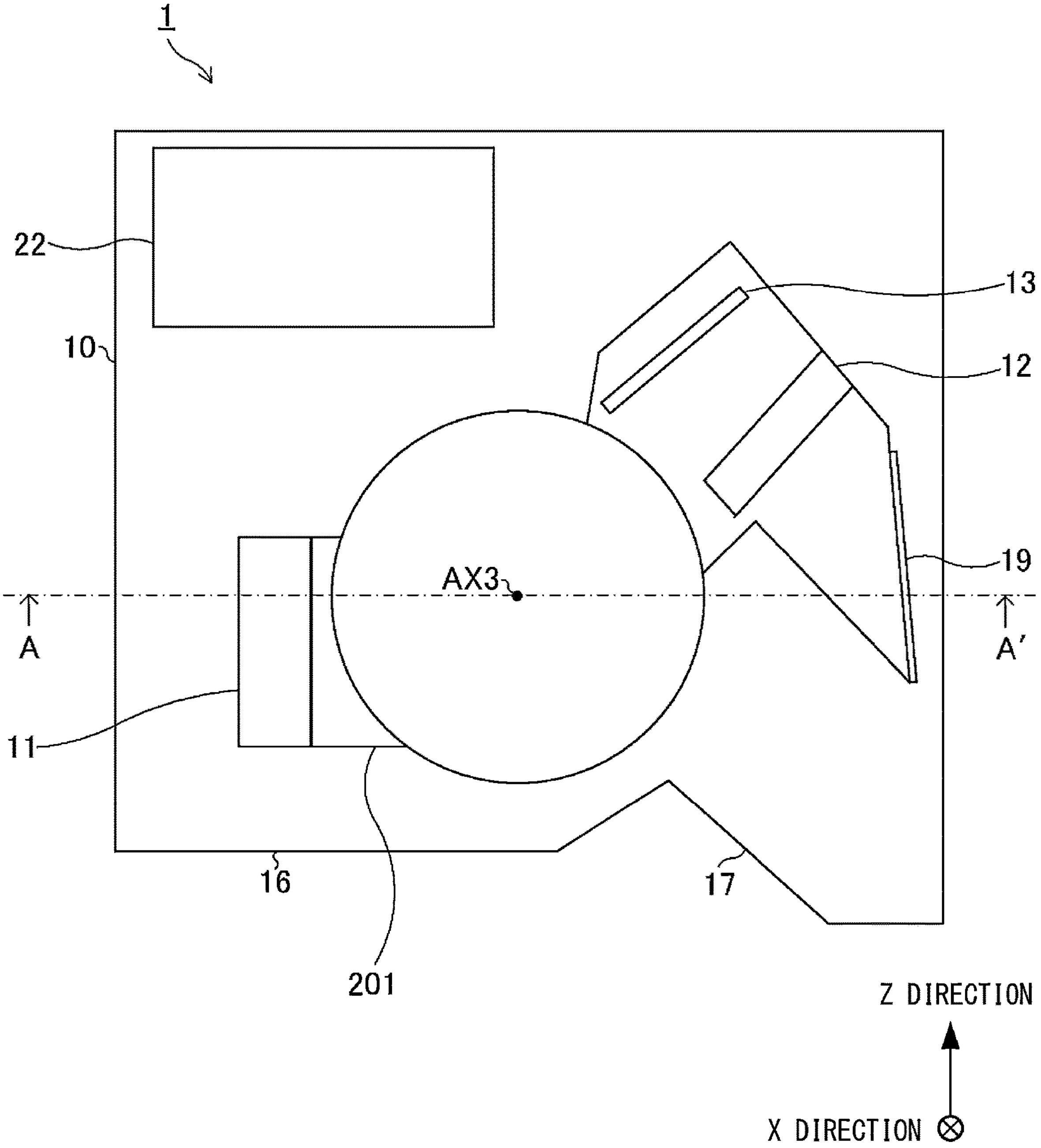
FIG. 8 is a view illustrating a second example of the layout of the motor.
Figure 9:
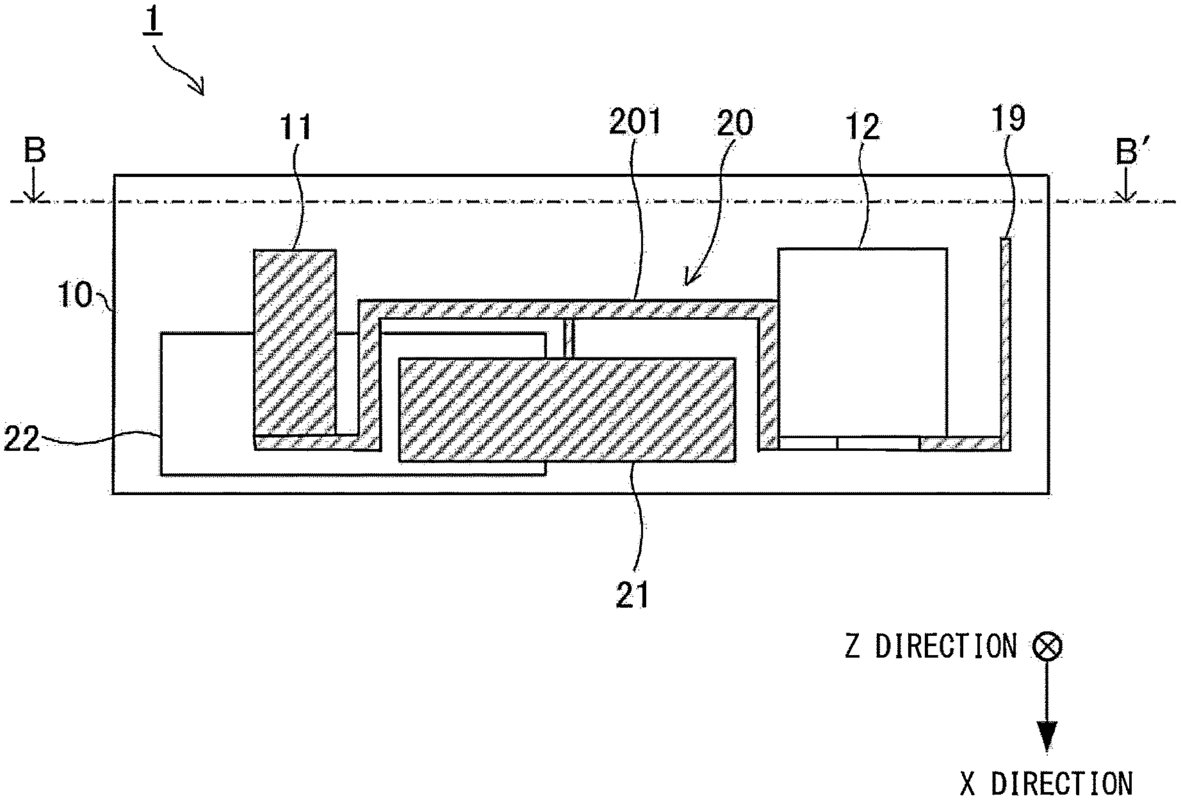
FIG. 9 is a view illustrating the second example of the layout of the motor.

FIGS. 8 and 9 are views illustrating a second example of the layout of the motor 21. FIG. 8 is a cross-sectional view perpendicular to the X direction of the optical displacement meter 1 taken along line B-B' in FIG. 9. FIG. 9 is a cross-sectional view perpendicular to the Z direction of the optical displacement meter 1 taken along line A-A' in FIG. 8.

In the second example, the light projecting/receiving module 20 includes the base member 201. The base member 201 includes a tubular portion extending along the X direction, a lid portion closing one end of the tubular portion in the X direction, and a flange portion extending radially outward from the other end of the tubular portion in the X direction. The light projecting unit 11, the light receiving lens 12, the imaging unit 13, and the reflecting member 19 are mounted on the flange portion of the base member 201.

In the second example, the light projecting/receiving module 20 overlaps at least one of the motor 21 and an accessory component of the motor 21 in the X direction. The accessory component of the motor 21 is, for example, an encoder that detects a rotation amount of a rotor of the motor 21, which is similar to the first example. According to the second example of the layout of the motor 21, it is easy to dispose the light projecting unit 11 away from the light receiving lens 12, and the imaging unit 13. Since the light projecting unit 11 is disposed away from the light receiving lens 12 and the imaging unit 13, scanning range of the slit light L1 can be expanded.

In addition, in the second example, the control unit 22 overlaps the light projecting/receiving module 20 and the motor 21 in the X direction. Note that the control unit 22 may be disposed at a position not overlapping the motor 21 in the X direction but overlapping the motor 21 as viewed from the X direction. In a case where the control unit 22 is disposed at the position overlapping the motor 21 as viewed from the X direction without overlapping the motor 21 in the X direction, the control unit 22 may overlap or does not necessarily overlap the light projecting/receiving module 20 and the motor 21 in the X direction.

<Processing Flow>

Figure 10:
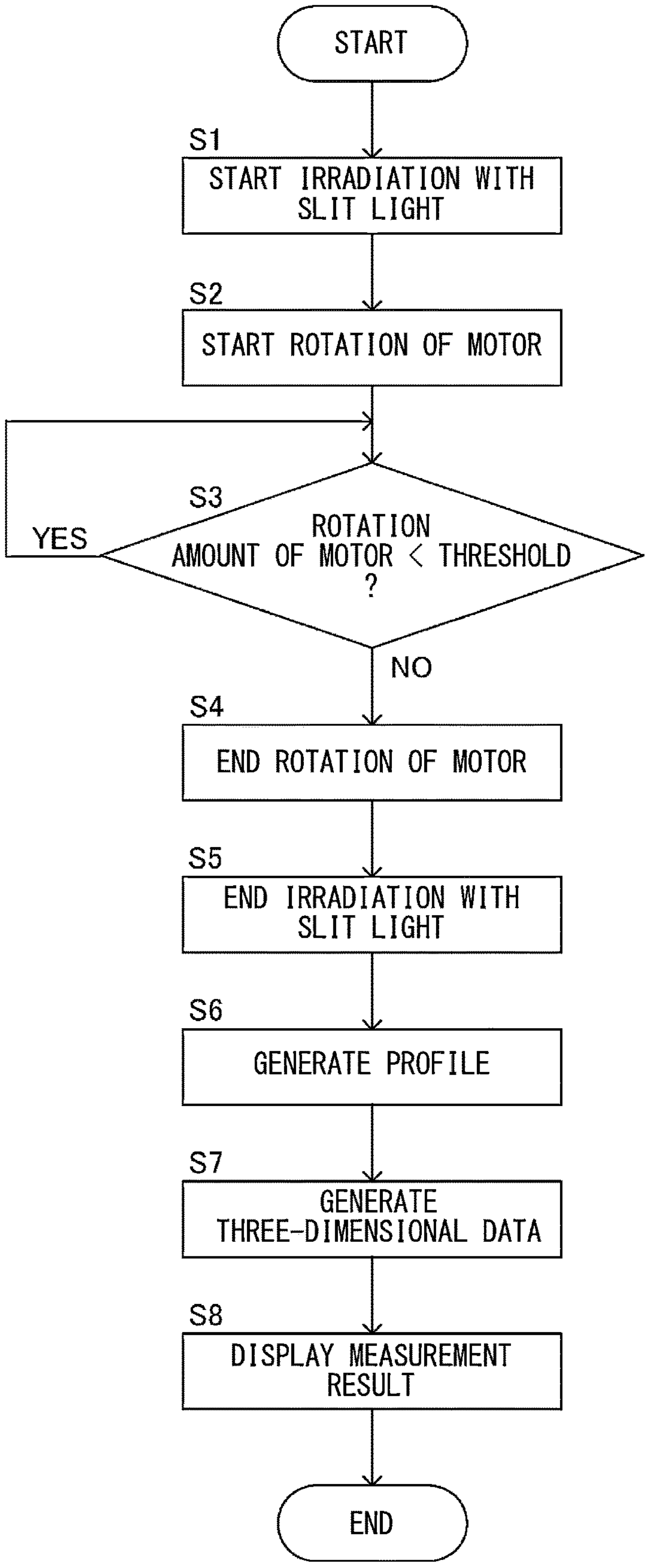
FIG. 10 is a view illustrating a processing flow of a measurement operation of the optical displacement measurement system.

FIG. 10 is a view illustrating a processing flow of a measurement operation of the optical displacement measurement system 100. When the input device 4 receives a user input for instructing start of measurement, the processing flow of FIG. 10 is started.

First, in step S1, the light projecting unit 11 starts irradiation with the slit light L1. In subsequent step S2, the motor control unit 23 starts rotation of the motor 21. Note that the process of step S1 and the process of step S2 may be executed simultaneously. Before execution of step S1, the motor control unit 23 may rotate the motor in order to move the light projecting/receiving module 20 to a predetermined scanning start position. By the processes of steps S1 and S2, scanning of the slit light L1 is started.

In subsequent step S3, the motor control unit 23 determines whether or not a rotation amount (rotation angle) of the motor 21 from the start of rotation is smaller than a threshold. In a case where the rotation amount of the motor 21 from the start of rotation is smaller than the threshold, the determination process of step S3 is continued, and the scanning of the slit light L1 is continued.

When the rotation amount of the motor 21 from the start of rotation reaches the threshold, the flow proceeds to step S4. Note that the threshold is a rotation amount calculated based on a measurement range. The measurement range is set by default, and when the user changes the measurement range, the control unit 22 (for example, the signal processing unit 24) calculates a threshold of a rotation amount based on the changed measurement range.

In step S4, the motor control unit 23 ends the rotation of the motor 21. In subsequent step S5, the light projecting unit 11 ends the irradiation with the slit light L1. Note that the process of step S4 and the process of step S5 may be executed simultaneously. By the processes of steps S4 and S5, the scanning of the slit light L1 is ended.

In subsequent step S6, the profile generation unit 27 generates a profile. Note that the profile generation unit 27 may start to generate a profile during the scanning with the slit light L1.

In subsequent step S7, the three-dimensional data generation unit 28 generates three-dimensional data.

In subsequent step S8, the display device 3 displays a measurement result. The measurement result is, for example, a cross-sectional view of the workpiece W based on the profile, a three-dimensional image of the workpiece W based on three-dimensional data, or the like. When the process of step S8 ends, the processing flow of FIG. 10 ends.

The optical displacement meter 1 has a measurement period in which the light projecting/receiving module 20 is rotated at a substantially constant speed in a first rotation direction (the counterclockwise direction CCW) or a second rotation direction (a clockwise direction CW) and a measurement operation is executed, and a non-measurement period in which the rotation direction of the light projecting/receiving module 20 is switched but the measurement operation is not executed. In the measurement period in which the measurement operation is executed, the motor rotates the light projecting/receiving module 20 at the substantially constant speed. It is preferable to set a switching period in the rotation direction in the non-measurement period since it is necessary to consider deceleration and acceleration and calculation such as association between a peak position in the V direction and a rotation angle becomes complicated.

<Limitation of Rotation Angle of Light Projecting/Receiving Module>

The optical displacement meter 1 limits the rotation angle of the light projecting/receiving module 20 such that specularly reflected light reflected from a specular reflection surface of the workpiece W is not captured by the imaging unit 13 when the light projecting unit 11 irradiates the workpiece W having the specular reflection surface, parallel to the XY plane extending in the X direction and the Y direction, with the slit light L1. As a result, the optical displacement meter 1 can suppress an influence of the specularly reflected light from the specular reflection surface of the workpiece W, the specularly reflected light being generated by rotating the light projecting/receiving module 20.

Figure 11:
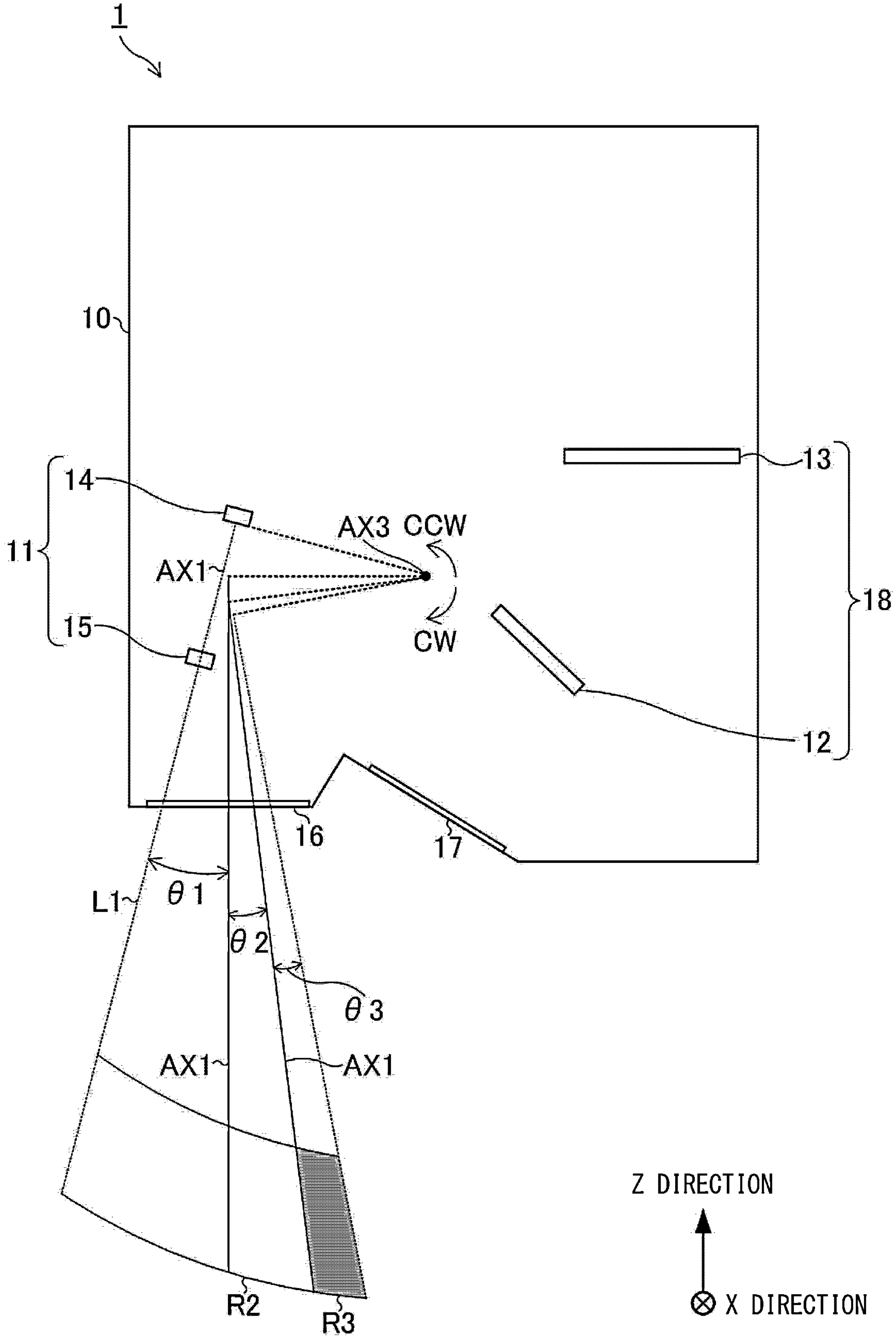
FIG. 11 is a view illustrating limitation of a rotation angle of a light projecting/receiving module.

The optical displacement meter 1 rotates the light projecting/receiving module 20 such that a measurement region R2 illustrated in FIG. 11 is irradiated with the slit light L1, and limits the rotation angle of the light projecting/receiving module 20 such that a region R3 illustrated in FIG. 11 is not irradiated with the slit light L1. When the measurement operation is executed, the optical displacement meter 1 advances image processing to at least the generation of the three-dimensional data by the three-dimensional data generation unit 28 with respect to reflected light from the measurement region R2 set such that the image processing is advanced to at least the generation of the three-dimensional data by the three-dimensional data generation unit 28. The region R3 is a region where the specularly reflected light reflected from the specular reflection surface parallel to the XY plane of the workpiece W reaches the imaging unit 13.

A measurement range in the Y direction may be eccentrically located closer to the light projecting unit 11 side than the light receiving unit 18 side with respect to the light projection axis AX1 parallel to the Z direction. In addition, a first angle range θ1 formed by the light projection axis AX1 passing through an end portion of the measurement region R2 on the light projecting unit 11 side and the light projection axis AX1 parallel to the Z direction may be larger than a second angle range θ2 formed by the light projection axis AX1 passing through an end portion of the measurement region R2 on the light receiving unit 18 side and the light projection axis AX1 parallel to the Z direction.

When the light projecting unit 11 is viewed to be located on the left side of the light receiving lens 12 in the YZ plane extending in the Y direction and the Z direction, the control unit 22 rotates the light projecting/receiving module 20 in the first angle range θ1 on the left side of the light projection axis AX1 of the light projecting unit 11 in the state of being parallel to the Z direction to execute the measurement operation, and rotates the light projecting/receiving module 20 in the second angle range θ2, which is smaller than the first angle range θ1 and does not include a predetermined angle at which the specularly reflected light is collected on the light receiving lens, on the right side of the light projection axis AX1 in the state of being parallel to the Z direction to execute the measurement operation. With these configurations, the measurement is performed in a wide angle range on the left side where specular reflection does not occur, and the measurement is performed in a narrow angle range where specular reflection does not occur on the right side where the specular reflection easily occurs like the region R3, so that the measurement range can be secured while avoiding an adverse effect of the specular reflection.

The control unit 22 may rotate the light projecting/receiving module 20 in a third angle range (the region R3) including a rotation angle at which the light projection axis AX1 and the optical axis AX2 of the light receiving lens 12 are symmetric with respect to a perpendicular line (the Z direction) of the X-Y plane in the non-measurement period in which the rotation direction of the light projecting/receiving module 20 is switched and the measurement operation is not executed. Since it is not necessary to consider the influence of specular reflection in the non-measurement period, the degree of freedom in design is increased by effectively utilizing a space on the right side in direction switching and a maintenance operation.

In addition, the optical displacement meter 1 may receive, via the communication unit 25, selection of one mode from a first mode in which the measurement operation is limited within the second angle range θ2 on the right side of the light projection axis AX2 in the state of being parallel to the Z direction, and a second mode in which the measurement operation is executed in an angle range obtained by combining the second angle range θ2 and a third angle range θ3 including a predetermined angle at which specular reflection occurs on a plane parallel to the X-Y plane. The measurement efficiency can be increased by measuring a workpiece having a relatively high reflectance in the first mode in which the limitation is imposed to suppress the influence of specular reflection, and measuring a workpiece, which has a relatively low reflectance and thus measurement is less likely to be affected even if specularly reflected light is received, in a wide range in the second mode in which the limitation is released, whereby convenience is improved.

The limitation of the rotation angle of the light projecting/receiving module 20 may be achieved, for example, by the control unit 22 executing control for limiting the rotation angle of the motor 21, or may be achieved by the optical displacement meter 1 including a stopper that physically stops a movement of the light projecting/receiving module 20.

Figure 12:
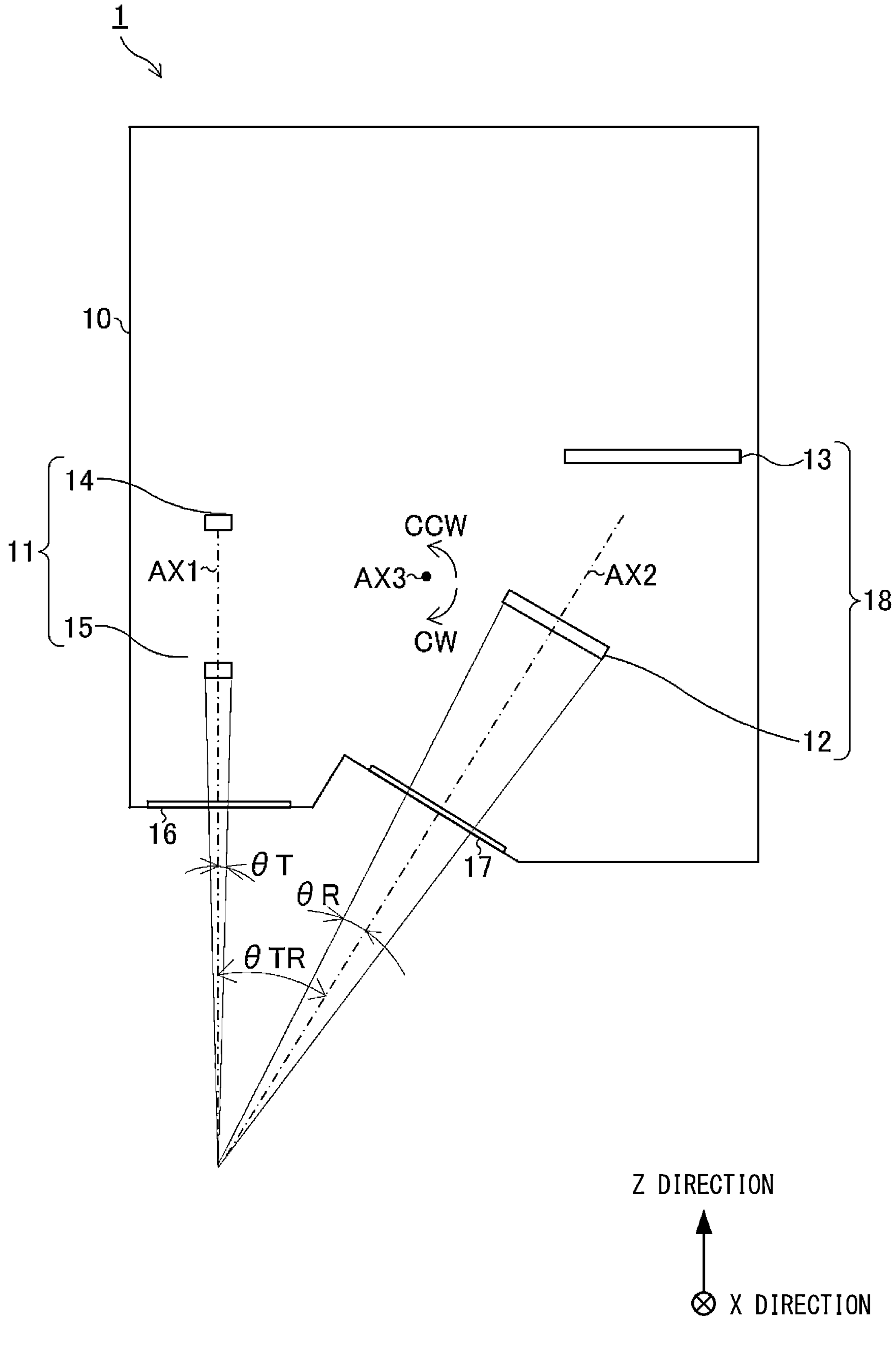
FIG. 12 is a view illustrating the limitation of the rotation angle of the light projecting/receiving module.

The optical displacement meter 1 limits the second angle range θ2 of the light projecting/receiving module 20, as an angle range θM in which the specularly reflected light from the specular reflection surface parallel to the X-Y plane is not received, based on an angle θTR (see FIG. 12) formed by a main light beam of the slit light and a main light beam of the reflected light accepted to the light receiving lens, a light collection angle θT (see FIG. 12) at which the slit light L1 emitted from the light source 14 is collected in the Y direction by the light projecting lens 15, and a light acceptance angle θR (see FIG. 12) of the light receiving lens 12. More specifically, the optical displacement meter 1 limits the rotation angle θM of the light projecting/receiving module 20 so as to satisfy (θTR−θ−θR)/2>θM. The light collection angle 6T is an angle at which the light emitted from the light source 14 is collected in the Y direction by the light projecting lens 15. The above relational expression is a condition for preventing a light beam, obtained by specular reflection of a light beam at an end portion on the left side of the drawing of the slit light on the specular reflection surface, from passing through an end portion on the left side of the drawing of the light acceptance angle of the light receiving lens 12 so as not to be collected on the light receiving lens 12. In addition, as the imaging unit 13 includes an image sensor (image sensor) that outputs a distribution of light receiving amounts of reflected light from the workpiece by a plurality of pixels two-dimensionally arranged, the light projecting/receiving module 20 has a predetermined measurement range in a direction of the light projection axis AX1, and thus, the angle θTR is a minimum angle at a position farthest from the light projecting unit 11 in the predetermined measurement range. That is, FIG. 12 illustrates a state in which light of the slit light reflected at an intermediate point of the measurement range travels along the optical axis AX2 of the light receiving lens 12, and θTR at this time is defined as an angle X. An angle Y formed by the light projection axis AX1 and light passing through a principal point of the light receiving lens 12 of light reflected at the position farthest from the light projecting unit 11 in the measurement range (the lower side in the drawing) is smaller than the angle X. Therefore, the control unit 22 controls the motor 21 so as to satisfy the above relational expression at the minimum angle (angle Y) of θTR.

The optical displacement meter 1 does not limit the rotation angle of the light projecting/receiving module 20 in one direction of rotation (the clockwise direction CW illustrated in FIGS. 11 and 12), but limits the rotation angle in the other direction of rotation (the counterclockwise direction CCW illustrated in FIGS. 11 and 12). This is because there is no region in which the specularly reflected light reflected from the specular reflection surface of the workpiece W reaches the imaging unit 13 on the outer side in the one direction of rotation (the clockwise direction CW illustrated in FIGS. 11 and 12) with respect to the measurement region R2 in a rotation angle range of the light projecting/receiving module 20 where the specularly reflected light reflected from the specular reflection surface of the workpiece W does not reach the imaging unit 13, and the region R3 where the specularly reflected light reflected from the specular reflection surface parallel to the XY plane of the workpiece W reaches the imaging unit 13 is present on the outer side of the other direction of rotation (the counterclockwise direction CCW illustrated in FIGS. 11 and 12) with respect to the measurement region R2.

Preferably, the optical displacement meter 1 can release the limitation of the rotation angle of the light projecting/receiving module 20.

For example, in a case where the control unit 22 achieves the limitation of the rotation angle of the light projecting/receiving module 20 by executing control to limit the rotation angle of the motor 21 in the measurement operation of generating a cross-sectional profile, the control unit 22 can release the limitation of the rotation angle of the light projecting/receiving module 20 by stopping the execution of the control to limit the rotation angle of the motor 21 in an operation other than the measurement operation, for example, the maintenance operation.

In addition, for example, in a case where the limitation of the rotation angle of the light projecting/receiving module 20 is achieved by a stopper that physically stops a movement of the light projecting/receiving module 20, the limitation of the rotation angle of the light projecting/receiving module 20 can be released by using the stopper as a movable member and retracting the stopper to a place not in contact with the light projecting/receiving module 20.

A timing at which the optical displacement meter 1 releases the limitation of the rotation angle of the light projecting/receiving module 20 is, for example, a timing at which the optical displacement meter 1 measures the workpiece W having no specular reflection surface parallel to the XY plane, a timing at which the optical displacement meter 1 makes the rotation angle range of the motor 21 larger than that at the time of the measurement operation in order to suppress fretting wear in a bearing of the motor 21, and the like. That is, in the maintenance operation that does not affect the specular reflection, it is effective to release the limitation of the rotation angle in order to suppress the fretting wear.

The rotation angle of the light projecting/receiving module 20 may be determined based on a state in which an upper surface of the housing 10 is parallel to the XY plane or a state in which a side surface of the housing 10 is parallel to the XZ plane extending in the X direction and the Z direction. As a result, the installation of the optical displacement meter 1 is simplified, and the accuracy of setting the region R2 and the region R3 is also improved.

The optical displacement meter 1 may further include a polarization filter configured to cancel a polarized component of the slit light specularly reflected by the workpiece W. For example, the polarization filter may be provided in the light receiving window 17. As a result, it is possible to prevent the imaging unit 13 from receiving the specularly reflected light that has been specularly reflected by the surface of the workpiece W which is not parallel to the XY plane. Further, a polarization filter whose polarization axis is substantially orthogonal to that of the polarization filter provided in the light receiving window 17 may be provided in the light projecting window 16. As a result, it is possible to further suppress the specularly reflected light from being received by the imaging unit 13. As the polarization filter, for example, a linear polarizing plate can be used.

<Conclusion>

Hereinafter, various embodiments described above will be comprehensively described.

For example, an optical displacement meter disclosed in the present specification has a configuration (first configuration) in which an optical displacement meter of a light sectioning method that measures a cross-sectional profile of a workpiece having a height in a Z direction based on a principle of triangulation includes: a light projecting/receiving module including a light projecting unit that emits slit light extending in an X direction, a light receiving lens that collects reflected light of the slit light reflected by the workpiece, and an imaging unit that receives light collected by the light receiving lens; a motor that integrally rotates the light projecting/receiving module; and a control unit that controls the motor to scan the slit light in a direction orthogonal to the X direction, and a rotation angle of the light projecting/receiving module is limited to prevent specularly reflected light reflected from a specular reflection surface from being captured by the imaging unit when the light projecting unit irradiates the workpiece having the specular reflection surface, parallel to an X-Y plane extending in the X direction and a Y direction, with the slit light.

The optical displacement meter having the first configuration may adopt a configuration (second configuration) in which a measurement range in the Y direction is eccentrically located closer to a side of the light projecting unit side than a light receiving unit side including the light receiving lens and the imaging unit with respect to a light projection axis of the light projecting unit in a state of being parallel to the Z direction.

The optical displacement meter having the first or second configuration may adopt a configuration (third configuration) in which, when the light projecting unit is viewed to be located on a left side of the light receiving lens in an Y-Z plane extending in the Y direction and the Z direction, the control unit rotates the light projecting/receiving module in a first angle range to execute a measurement operation on a left side of a light projection axis of the light projecting unit in a state of being parallel to the Z direction, and rotates the light projecting/receiving module in a second angle range, which is smaller than the first angle range and does not include a predetermined angle at which the specularly reflected light is collected on the light receiving lens, to execute the measurement operation on a right side of the light projection axis in the state of being parallel to the Z direction.

The optical displacement meter having the third configuration may adopt a configuration (fourth configuration) in which the control unit causes the motor to rotate the light projecting/receiving module in a third angle range including a rotation angle at which the light projection axis and an optical axis of the light receiving lens are symmetrical with respect to a perpendicular line of the X-Y plane in a non-measurement period in which a rotation direction of the light projecting/receiving module is switched and the measurement operation is not executed.

The optical displacement meter having the third configuration may adopt a configuration (fifth configuration) in which the optical displacement meter receives selection of one mode from a first mode in which the measurement operation is limited within the second angle range, and a second mode in which the measurement operation is executed in an angle range obtained by combining the second angle range and a third angle range including the predetermined angle on the right side of the light projection axis in the state of being parallel to the Z direction.

The optical displacement meter having the third configuration may adopt a configuration (sixth configuration) in which the control unit controls the motor to satisfy a relational expression of $(\theta TR-\theta T-\theta R)/2>\theta M$ where $\theta M$ is the second angle range;

- $\theta TR$: $\theta TR$ is an angle formed by the slit light and the reflected light accepted to the light receiving lens;
- $\theta T$: $\theta T$ is a light collection angle (half angle) of the slit light; and
- $\theta R$: $\theta R$ is a light acceptance angle (half angle) of the light receiving lens.

The optical displacement meter having any one of the first to sixth configurations may adopt a configuration (seventh configuration) in which, as the imaging unit includes an image sensor that outputs a distribution of light receiving amounts of the reflected light from the workpiece by a plurality of pixels arranged two-dimensionally, the light projecting/receiving module has a predetermined measurement range in a direction of the light projection axis, the $\theta TR$ has a minimum angle at a position farthest from the light projecting unit in the predetermined measurement range, and the control unit controls the motor to satisfy the relational expression at the minimum angle of the $\theta TR$.

<Other Modifications>

Note that, in addition to the above-described embodiments, various alterations can be applied to various technical features disclosed in the present specification within a scope not departing from the spirit of the technical creation. That is, it is to be understood that the above-described embodiments are illustrative in all respects and not restrictive, and the technical scope of the invention is defined by the claims, and includes all alterations falling within the meaning and scope equivalent to the claims.

What is claimed is:

1. An optical displacement meter of a light sectioning method that measures a cross-sectional profile of a workpiece having a height in a Z direction based on a principle of triangulation, the optical displacement meter comprising:

- a light projecting/receiving module including a light projecting unit that emits slit light extending in an X direction, a light receiving lens that collects reflected light of the slit light reflected by the workpiece, and an imaging unit that receives light collected by the light receiving lens;
- a motor that integrally rotates the light projecting/receiving module; and
- a control unit that controls the motor to scan the slit light during a first measurement operation in a direction orthogonal to the X direction,
- wherein an angle range of the light projecting/receiving module during the first measurement operation is limited to prevent specularly reflected light reflected from a specular reflection surface from being captured by the imaging unit when the light projecting unit irradiates the workpiece having the specular reflection surface, parallel to an X-Y plane extending in the X direction and a Y direction, with the slit light.

2. The optical displacement meter according to claim 1, wherein a measurement range in the Y direction is eccentrically located closer to a side of the light projecting unit side than a light receiving unit side including the light receiving lens and the imaging unit with respect to a light projection axis of the light projecting unit in a state of being parallel to the Z direction.

3. The optical displacement meter according to claim 1, wherein

- the angle range includes a first angle range and a second angle range, and
- when the light projecting unit is viewed to be located on a left side of the light receiving lens in a Y-Z plane extending in the Y direction and the Z direction, the control unit
  - rotates the light projecting/receiving module in a first angle range to execute the first measurement operation on a left side of a light projection axis of the light projecting unit in a state of being parallel to the Z direction, and
  - rotates the light projecting/receiving module in the second angle range, which is smaller than the first angle range and does not include a predetermined angle at which the specularly reflected light is collected on the light receiving lens, to execute the first measurement operation on a right side of the light projection axis in the state of being parallel to the Z direction.

4. The optical displacement meter according to claim 3, wherein the control unit causes the motor to rotate the light projecting/receiving module in a third angle range including a rotation angle at which the light projection axis and an optical axis of the light receiving lens are symmetrical with respect to a perpendicular line of the X-Y plane in a non-measurement period in which a rotation direction of the light projecting/receiving module is switched and the first measurement operation is not executed.

5. The optical displacement meter according to claim 3, the optical displacement meter receiving selection of one mode from

- a first mode in which the first measurement operation is limited within the second angle range, and
- a second mode in which a second measurement operation is executed in an angle range obtained by combining the second angle range and a third angle range including the predetermined angle,
- on the right side of the light projection axis in the state of being parallel to the Z direction.

6. The optical displacement meter according to claim 3, wherein the control unit controls the motor to satisfy a relational expression of (θTR−θT−θR)/2>θM, where OM is the second angle range;

θTR: θTR is an angle formed by a main light beam of the slit light and a main light beam of the reflected light accepted to the light receiving lens;

θT: θT is a light collection angle (half angle) of the slit light; and

θR: θR is a light acceptance angle (half angle) of the light receiving lens.

7. The optical displacement meter according to claim 6, wherein as the imaging unit includes an image sensor that outputs a distribution of light receiving amounts of the reflected light from the workpiece by a plurality of pixels arranged two-dimensionally, the light projecting/receiving module has a predetermined measurement range in a direction of the light projection axis, the θTR has a minimum angle at a position farthest from the light projecting unit in the predetermined measurement range, and the control unit controls the motor to satisfy the relational expression at the minimum angle of the θTR.

8. An optical displacement meter of a light sectioning method that measures a cross-sectional profile of a workpiece having a height in a Z direction based on a principle of triangulation, the optical displacement meter comprising:

a light projecting/receiving module including a light projecting unit that emits slit light extending in an X direction, a light receiving lens that collects reflected light of the slit light reflected by the workpiece, and an imaging unit that receives light collected by the light receiving lens;

a motor that integrally rotates the light projecting/receiving module; and a control unit that controls the motor to scan the slit light during a first measurement operation in a direction orthogonal to the X direction, wherein the control unit controls, during the first measurement operation, the motor to rotate the light projecting/receiving module in an angle range which does not include a predetermined angle at which the light receiving lens collects specularly reflected light reflected from a specular reflection surface when the light projecting unit irradiates the workpiece having the specular reflection surface, parallel to an X-Y plane extending in the X direction and a Y direction, and the control unit controls, during the first measurement operation, the motor not to rotate the light projecting/receiving module in another angle range which includes the predetermined angle.

9. The optical displacement meter according to claim 8, wherein a measurement range in the Y direction is eccentrically located closer to a side of the light projecting unit side than a light receiving unit side including the light receiving lens and the imaging unit with respect to a light projection axis of the light projecting unit in a state of being parallel to the Z direction.

10. The optical displacement meter according to claim 8, wherein the angle range includes a first angle range and a second angle range, and when the light projecting unit is viewed to be located on a left side of the light receiving lens in a Y-Z plane extending in the Y direction and the Z direction, the control unit rotates the light projecting/receiving module in the first angle range to execute the first measurement operation on a left side of a light projection axis of the light projecting unit in a state of being parallel to the Z direction, and rotates the light projecting/receiving module in the second angle range, which is smaller than the first angle range and does not include the predetermined angle, to execute the first measurement operation on a right side of the light projection axis in the state of being parallel to the Z direction.

11. The optical displacement meter according to claim 10, wherein the control unit causes the motor to rotate the light projecting/receiving module in the another angle range during a non-measurement period in which a rotation direction of the light projecting/receiving module is switched and the first measurement operation is not executed.

12. The optical displacement meter according to claim 10, the optical displacement meter receiving selection of one mode from a first mode in which the first measurement operation is limited within the second angle range, and a second mode in which a second measurement operation is executed in the second angle range and the another angle range, on the right side of the light projection axis in the state of being parallel to the Z direction.

13. The optical displacement meter according to claim 10, wherein the control unit controls the motor to satisfy a relational expression of (θTR−θT−θR)/2>θM, where OM is the second angle range;

θTR: θTR is an angle formed by a main light beam of the slit light and a main light beam of the reflected light accepted to the light receiving lens;

θT: θT is a light collection angle (half angle) of the slit light; and

θR: θR is a light acceptance angle (half angle) of the light receiving lens.

14. The optical displacement meter according to claim 13, wherein as the imaging unit includes an image sensor that outputs a distribution of light receiving amounts of the reflected light from the workpiece by a plurality of pixels arranged two-dimensionally, the light projecting/receiving module has a predetermined measurement range in a direction of the light projection axis, the θTR has a minimum angle at a position farthest from the light projecting unit in the predetermined measurement range, and the control unit controls the motor to satisfy the relational expression at the minimum angle of the θTR.

* * * * *